(12) United States Patent
Ameriguian

(10) Patent No.: US 8,420,195 B2
(45) Date of Patent: Apr. 16, 2013

(54) PROTECTIVE SUBSTRATE FOR A BATTERY

(76) Inventor: Robert Ameriguian, Grosse Ile, MI (US)

( * ) Notice: Subject to any disclaimer, the term of this patent is extended or adjusted under 35 U.S.C. 154(b) by 278 days.

(21) Appl. No.: 12/862,975

(22) Filed: Aug. 25, 2010

(65) Prior Publication Data

US 2011/0052851 A1 Mar. 3, 2011

Related U.S. Application Data

(60) Provisional application No. 61/237,447, filed on Aug. 27, 2009.

(51) Int. Cl.
*B32B 9/00* (2006.01)
*B32B 33/00* (2006.01)
*B65D 65/28* (2006.01)

(52) U.S. Cl.
USPC .......... 428/40.1; 428/42.2; 428/42.3; 428/43; 428/192

(58) Field of Classification Search ................. 428/40.1, 428/42.2, 42.3, 43, 192
See application file for complete search history.

(56) References Cited

U.S. PATENT DOCUMENTS

| | | | | |
|---|---|---|---|---|
| 3,421,239 A | * | 1/1969 | Smith | 40/657 |
| 3,875,396 A | | 4/1975 | Webb | |
| 4,221,846 A | | 9/1980 | Armstrong et al. | |
| 4,479,316 A | * | 10/1984 | Wippern | 40/661.09 |
| 4,497,883 A | | 2/1985 | Murray | |
| 4,606,982 A | | 8/1986 | Nelson et al. | |
| 4,751,150 A | | 6/1988 | Oogita et al. | |
| 5,403,636 A | * | 4/1995 | Crum | 428/41.8 |
| 6,514,588 B2 | * | 2/2003 | Rosenbaum et al. | 428/40.1 |
| 6,803,084 B1 | * | 10/2004 | Do et al. | 428/40.1 |
| 7,273,504 B2 | | 9/2007 | Nagai et al. | |
| 7,781,104 B2 | | 8/2010 | Kubo et al. | |

* cited by examiner

*Primary Examiner* — Patricia Nordmeyer
(74) *Attorney, Agent, or Firm* — Young, Basile, Hanlon & MacFarlane, P.C.

(57) ABSTRACT

Disclosed herein an adhesive substrate having a peelable backing for use with battery packs. The adhesive substrate can include an integral tab, and perforations can be formed between a main body of the substrate and the tab. To peel the backing from the main body, the tab can be detached from the main body while remaining bonded to the peelable backing. The tab can be pulled to peel the backing from the main body of the substrate. The substrate is then applied to the battery pack.

9 Claims, 2 Drawing Sheets

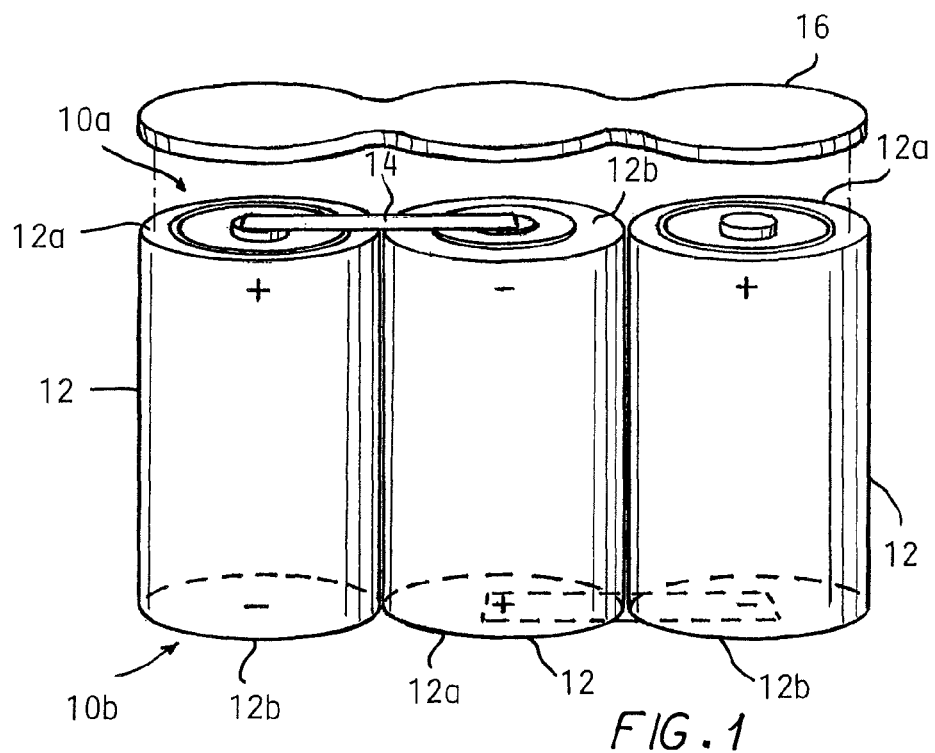
FIG. 1
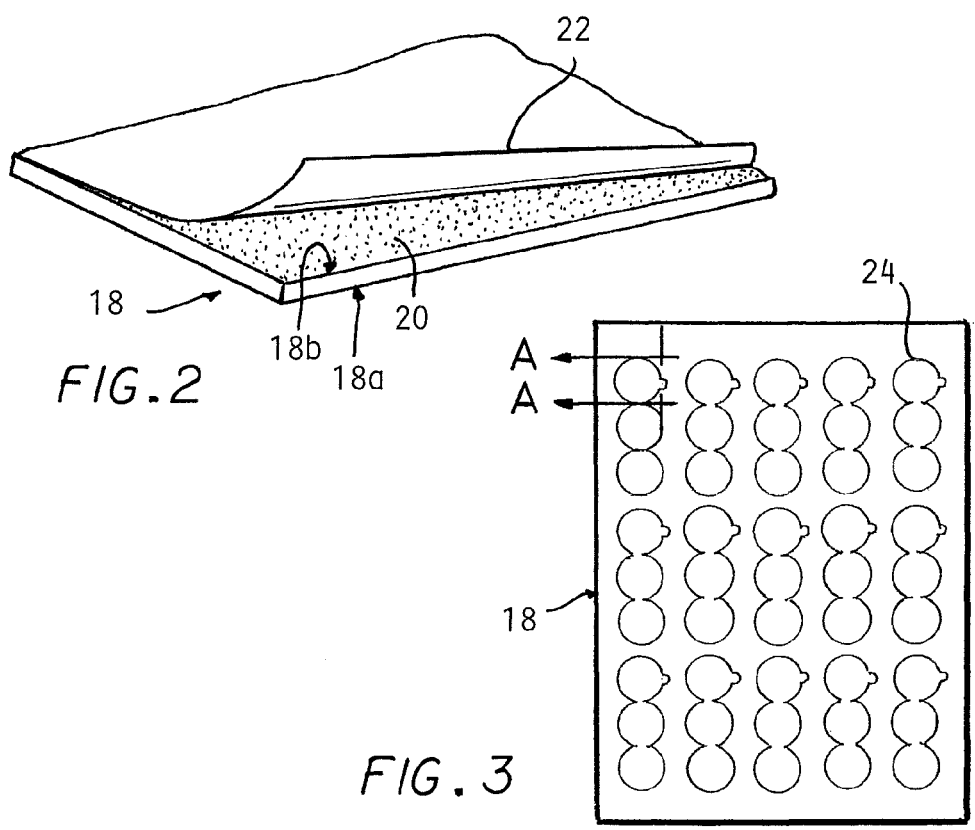
FIG. 2
FIG. 3

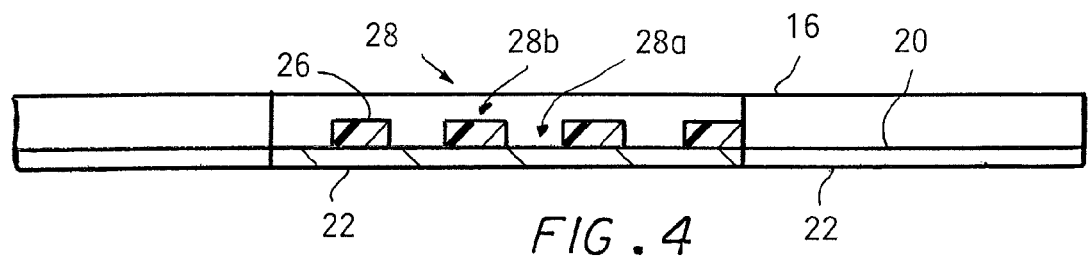
FIG. 4
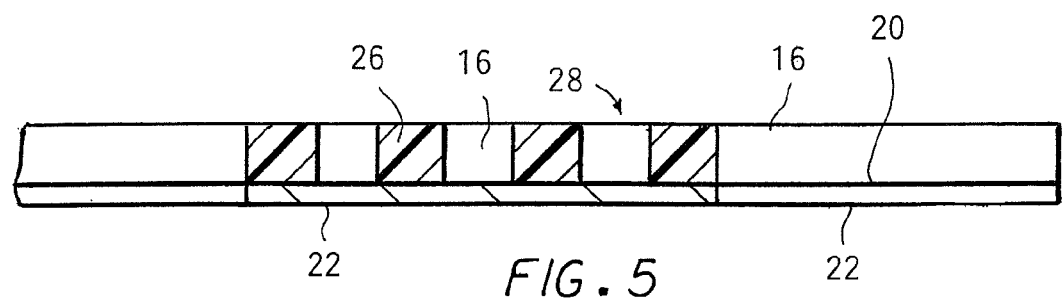
FIG. 5
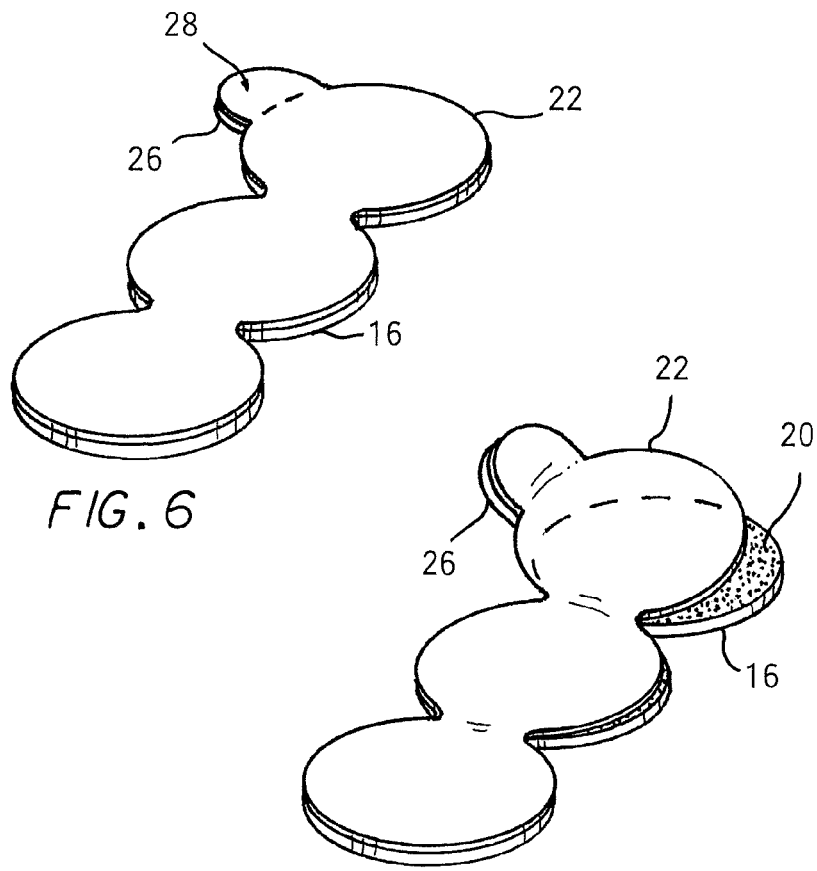
FIG. 6
FIG. 7

PROTECTIVE SUBSTRATE FOR A BATTERY

RELATED APPLICATION

This application is a non-provisional application claiming priority on U.S. Provisional Patent Application Ser. No. 61/237,447 filed Aug. 27, 2009, which is hereby incorporated by reference in its entirety.

TECHNICAL FIELD

The invention relates to protective substrates applied to batteries and methods for making and applying same.

BACKGROUND

Battery packs are used in many environments including medical equipment, environmental monitoring equipment and power tools, to name a few. Each battery pack can include, for example, one or more battery cells, connectors that are welded to the cells to electrically connect the cells, one or more sheets of vulcanized paper adhered to a top and/or bottom of the cells, and shrink wrap that encloses the cells, connectors and vulcanized paper.

The vulcanized paper, which is also known as "fish paper", can serve to serve to insulate the cells and otherwise protect the cells from damage, such as damage that may result from an impact to the battery pack. Vulcanized paper can be adhered to the top or bottom of the cells in various manners. In one example, a worker can bond vulcanized paper to the cells by applying a layer of adhesive to the vulcanized paper and then quickly pressing the vulcanized paper against the cells and allowing the adhesive to set. In another example, the vulcanized paper can be manufactured to include an adhesive layer on one of its sides, and the adhesive layer can be covered with backing paper to protect the adhesive layer until the vulcanized paper is ready to be applied to the cells. At the time of applying the vulcanized paper to the cells, a worker can peel the backing paper from the vulcanized paper and then press the vulcanized paper against the cells to bond the vulcanized paper to the cells.

Bonding vulcanized paper to battery cells is problematic. Having a worker bond vulcanized paper to the cells by applying a layer of adhesive to the vulcanized paper and then quickly pressing the vulcanized paper against the cells and allowing the adhesive to set is an inefficient and time consuming operation. For example, the worker must manually apply the layer of adhesive to each piece of vulcanized paper and evenly distribute the adhesive on a surface of the vulcanized paper before bonding the vulcanized paper to the cells. Additionally, manufacturing vulcanized paper to include an adhesive layer on one of its sides and covering the adhesive layer with backing paper until the vulcanized paper is ready to be applied to the cells is also inefficient. Workers often struggle to remove the backing paper from the vulcanized paper. Since different patterns of vulcanized paper are often cut from stock sheets of adhesive-backed vulcanized paper using an automated die, laser or water cutting tool, it is impractical to use backing paper that is pre-scored (i.e., scored prior to cutting patterns into the stock sheet) because the scores may not line up with the cut patterns of vulcanized paper.

SUMMARY

Examples of a protective layer for positioning on adjacent battery cells in a battery pack are shown. In one such example, the protective layer includes a substrate including a main section having a shape substantially corresponding to at least one surface of the battery cells and having a tab extending from an edge of the main section. The tab is frangibly coupled to the main section. A backing material overlays the substrate in a region corresponding to at least a portion of the main section and the tab. A layer of adhesive material between the backing material and the substrate to releasably bond the backing material to the substrate. The backing material is selectively removable in response to breaking the tab from the main section and peeling the backing material from the main section to expose the layer of adhesive on the main section.

BRIEF DESCRIPTION OF THE DRAWINGS

The description herein makes reference to the accompanying drawings wherein like reference numerals refer to like parts throughout the several views, and wherein:

FIG. 1 is an exploded perspective view of a plurality of battery cells and a protective layer;

FIG. 2 is a perspective view of a stock sheet of vulcanized paper having an adhesive layer and backing paper that is partially peeled away from the vulcanized paper;

FIG. 3 is a top elevation of the stock sheet of vulcanized paper having the adhesive layer and backing paper illustrating a cutting template for forming a plurality of protective layers, the stock sheet oriented such that the vulcanized paper side faces upward;

FIG. 4 is a cross section view along line A-A in FIG. 3 at a junction between a main section and a tab of one of the protective layers;

FIG. 5 is another example of a cross section view along the junction between the main section and the tab of one of the protective layers;

FIG. 6 is a perspective view of one of the protective layers oriented such that its backing paper faces upward; and FIG. 7 is a perspective view of the protective layer of FIG. 6 with the tab separated from the main section and the backing paper partially peeled from the main section.

DETAILED DESCRIPTION

A protective layer for positioning adjacent at least one of a first end and a second end of one or more battery cells in a battery back is disclosed and the protective layer can be easily applied to the battery cells. In one embodiment, the protective layer includes a brittle substrate having a main section having a shape substantially corresponding to a perimeter of the first or second end of the one or more battery cells and having a tab extending from an edge of the main section. The substrate defines one or more perforations along a junction between the main section and the tab. A layer of adhesive overlays a surface of the substrate, and backing paper having a shape corresponding to the main section and the tab of the substrate is attached to the layer of adhesive. The backing paper is selectively removable in response to breaking the tab from the main section and peeling the backing paper from the main section to expose the layer of adhesive on the main section.

As shown in FIG. 1, an example of a battery pack 10 can include one or more battery cells 12, with the illustrated battery pack 10 including three cells 12. Alternatively, a different number of cells 12 can be included. The cells 12 can be lead-acid cells, lithium-ion cells, nickel-cadmium cells or another type of cells. Each cell 12 can have a top or first end 12a and a second or bottom end 12b opposite the top end 12a. Each end 12a and 12b can be electrically conductive. For example, the top end 12a can define a positive terminal and the bottom end 12b can define a negative terminal. The cells 12 can be oriented in alternating fashion with a first cell having its top end 12a oriented upward, a second cell having its bottom end 12b oriented upward, a third cell having its top end 12a oriented upward, etc.

The cells 12 can be electrically connected to one another using connectors 14. The connectors 14 can be formed of a highly electrically conductive material, such as nickel, brass or silver. Each connector 14 can extend between respective terminals of a pair of adjacent cells 12 and can be electrically connected thereto. For example, a first end of one of the connectors 14 can be connected to a positive terminal of one cell 12 and an opposing end of the connector 14 can be connected to a negative terminal of an adjacent cell 12 for electrical communication between the two cells 12. Each connector 14 can be connected to cells 12 by, as an example, soldering the connector 14 to the cells 12. While the cells 12 are shown as being serially connected, some or all of the cells 12 can alternatively be connected in parallel.

Still referring to FIG. 1, a protective substrate 16 can be positioned against an end 10a of the battery pack 10. While not shown, another substrate can be positioned against an opposing end 10b of the battery pack 10. The substrate 16 can have shape substantially corresponding to a perimeter of the group of cells 12. For example, the substrate 16 can be shaped to overlay the conductive portions at the ends 12a and 12b of the cells 12 on the end 10a of the battery pack 10. As another example, the substrate 16 can be shaped to corresponding to a perimeter shape defined by the ends 12a and 12b of the cells 12 in aggregate. As yet another example, the substrate 16 can be shaped to overlay the terminals of the cells 12a and 12b without extending to the perimeters of the ends 12a and 12b of the cells 12.

The substrate 16 can be formed of a brittle material such as vulcanized paper, also known as "fish paper", of the type available from S & S Electronics of Oceanside, Calif. or Composite Components of Carlsbad, Calif., among others. When made of vulcanized paper, the substrate 16 can have a thickness of 0.010 inches to 0.062 inches, though the substrate 16 can have a thickness outside that range. Instead of being constructed from vulcanized paper, the substrate 16 can be formed of another material such as cardboard, PVC, thermoplastic such as sold under the trademark Plexiglas or another material. The substrate 16 can be highly electrically insulating, and the substrate 16 can additionally have other properties such as a high impact resistance and/or an aversion to chemical reactions. The substrate 16 can protect the battery 10 from damage if the battery 10 is impacted, and the substrate 16 can also provide insulation to avoid unintended paths of electrical flow. Alternatively, the substrate need not be brittle.

Referring now to FIG. 2, a stock sheet of material 18, e.g., vulcanized paper, from which the substrate 16 is formed is shown. The stock sheet of material 18 can have a standard size, such as 18" by 24", or the material 18 can come in rolled form. The material 18 can have a first side 18a and a second side 18b. A layer of adhesive 20 can be applied to the second side 18b of the material 18, and backing paper 22 can overlay the layer of adhesive 20 to form a composite as best seen in FIGS. 4 and 5. The backing paper 22 can be peelable from the adhesive 20. For example, the backing paper 22 can be made of a material that is not strongly bonded to the adhesive 20.

As shown in FIG. 3, a plurality of patterns 24, each corresponding to one of the substrates 16 and a tab 26 conjoined therewith (see FIG. 6) once cut from the material 18, can be arranged on the material 18 to maximize the number of substrates 16 produced from the material 18. The patterns 24 can be programmed in an automated cutting machine and need not actually be transcribed onto the material 18. The substrates 16 and tabs 26 can be die cut, laser cut, water cut, or otherwise cut from the material 18. Cuts can extend through the material 18 and the backing paper 22 in order to separate each substrate 16 and its tab 26 from the remainder of the material 18.

In addition to cutting the substrates 16 from the material 18, perforations 28 can be formed between the substrate 16 (also referred to as a main section) and its tab 26 as shown in FIG. 4. The perforations 28 can be at a junction between each substrate 16 and its tab 26, such as along an edge or perimeter of the substrate 16. In the example shown in FIG. 4, the perforations include alternating through perforations 28a that extend from one side of the substrate 16 to the other side of the substrate 16 without penetrating the backing paper 22 and shallow perforations 28b that do not extend all the way to the backing paper 22. The perforations 28 thus result in the tab 26 being frangibly connected to the substrate 16 by only spaced apart portions of the tab 26 having a thickness less than the thickness of the substrate 16, while the backing paper 22 covering the tab 26 is fully intact with the remainder of the backing paper 22. The perforations 28 can be formed by configuring the power of a cutting tool and/or timing during which the cutting tool performs a cutting operations between the substrate 16 and tab 26 to achieve a desired perforation 28 depth, such as operating the cutting tool for a longer time and/or at a higher power while forming perforations 28a compared to perforations 28b.

The perforations 28 can have an alternative form than shown in FIG. 4. For example, FIG. 5 shows another example of perforations that include only perforations 28a, which extend from one side of the substrate 16 to the other side of the substrate 16 without penetrating the backing paper 22. The perforations 28 shown in FIG. 5 may be necessary, for example, when variable cutting tool power is not available.

After cutting each substrate 16 and its tab 26 from the material 18 and forming perforations 28 that facilitate separation of the tab 26 from the substrate 16, the substrate 16, tab 26 and backing paper 22 assembly shown in FIG. 6 is ready to be distributed to a worker for applying the substrate 16 to cells 12. The backing paper 22 can easily be separated from the substrate 16, thereby exposing the adhesive layer 20, by breaking the tab 26 from the substrate 16 along the perforations 28 and then peeling the backing paper 22 from the substrate 16. The tab 26 thus facilitates removal of the backing paper 22 from the substrate 16 by allowing a worker to grasp the tab 26 and backing paper 22 while peeling the paper 22 from the substrate 16. After removing the backing paper 22 from the substrate 16, the worker can apply the substrate 16 to the cells. At the time of applying the substrate 16 to the cells, the worker can press the substrate 16 against the cells so that the adhesive layer 20 bonds the substrate 16 to the cells.

The above-described examples have been described in order to allow easy understanding of the protective layer and do not limit the protective layer. On the contrary, the attached claim is intended to cover various modifications and equivalent arrangements included within the scope of the appended claims, which scope is to be accorded the broadest interpretation so as to encompass all such modifications and equivalent structure as is permitted under the law.

What is claimed:

1. A protective layer for positioning on adjacent battery cells in a battery pack, the protective layer comprising:
   a substrate including a main section having a shape substantially corresponding to at least one surface of the battery cells and having a tab extending from an edge of the main section, wherein the tab is frangibly coupled to the main section;

backing material overlaying the substrate in a region corresponding to at least a portion of the main section and the tab; and a layer of adhesive material disposed on the substrate between the backing material and the substrate to releasably bond the backing material to the substrate;

wherein the backing material and tab extending from the edge of the main section are selectively removable in response to:

breaking the tab from the edge of the main section wherein the tab remains adhered to the backing material by the adhesive material; and peeling the backing material and adhered tab from the main section to expose the layer of adhesive on the main section.

2. The protective layer of claim 1, wherein the substrate is composed at least in part of one of vulcanized paper, cardboard, PVC and thermoplastic.

3. The protective layer of claim 1, wherein the substrate shape corresponds to a perimeter shape defined by the one or more battery cells.

4. The protective layer of claim 1, wherein the battery cells include at least one terminal and the substrate shape is configured so that the substrate overlays the at least one terminal.

5. The protective layer of claim 1, wherein the substrate has a thickness ranging between about 0.010 inches to about 0.062 inches.

6. The protective layer of claim 1, wherein the tab is frangibly coupled to the main section by perforations that extend completely through the substrate.

7. The protective layer of claim 1, wherein the tab is frangibly coupled to the main section by perforations that extend only partially through the substrate.

8. The protective layer of claim 1, wherein the tab is sized and configured to permit a worker to grasp the tab when peeling the backing material from the main section.

9. The protective layer of claim 1, wherein the backing material is composed at least in part of paper.

* * * * *